United States Patent [19]

Etherington et al.

[11] Patent Number: 5,244,072
[45] Date of Patent: Sep. 14, 1993

[54] ARTICULATION JOINT

[75] Inventors: Michael Etherington, Abingdon, Va.; Michael R. Long, Gainsborough, England

[73] Assignee: Dosco Overseas Engineering Ltd., Notts, England

[21] Appl. No.: 906,577

[22] Filed: Jun. 30, 1992

[30] Foreign Application Priority Data

Jan. 14, 1992 [GB] United Kingdom ................. 9200660

[51] Int. Cl.5 ............................................. B65G 65/02
[52] U.S. Cl. ...................................... 198/303; 414/528
[58] Field of Search ............................. 198/303, 861.2; 414/528; 180/137, 235

[56] References Cited

U.S. PATENT DOCUMENTS

| | | | |
|---|---|---|---|
| 2,674,364 | 4/1954 | Cartlidge | 198/303 |
| 2,690,834 | 10/1954 | Lundquist | 198/861.2 |
| 2,765,862 | 10/1956 | Tucker, Jr. | 180/51 |
| 2,776,040 | 1/1957 | Snyder | 198/303 |
| 3,008,592 | 11/1961 | Johnson | 214/83.36 |
| 3,100,563 | 8/1963 | Biedess | 198/861.2 X |
| 3,439,937 | 4/1969 | Dixon | 280/446 |
| 3,504,753 | 4/1970 | Rutley | 180/14 |
| 3,557,937 | 1/1971 | Karse | 198/861.2 |
| 3,827,720 | 8/1974 | Lee | 280/400 |
| 3,880,303 | 4/1975 | Coval | 214/83.36 |
| 3,908,841 | 9/1975 | Lee et al. | 214/83.36 |
| 4,031,997 | 6/1977 | Nelson | 198/303 X |
| 4,074,784 | 2/1978 | Lee et al. | 180/24 |
| 4,160,619 | 7/1979 | Nelson | 414/528 X |
| 4,291,777 | 9/1981 | Yale | 180/24.06 |
| 4,382,607 | 5/1983 | Voight | 280/408 |
| 4,890,684 | 1/1990 | Simmons | 180/135 |
| 5,044,858 | 9/1991 | Scott et al. | 414/10 |

OTHER PUBLICATIONS

Joy Manufacturing Co., "Conveyor Assembly", May 25, 1974.

Primary Examiner—Robert P. Olszewski
Assistant Examiner—James R. Bidwell
Attorney, Agent, or Firm—Webb, Burden, Ziesenheim & Webb

[57] ABSTRACT

An articulation joint for pivotally connecting adjacent sections of a vehicle. The joint includes a first slewing ring and a second slewing ring. Each slewing ring has an outer member and an inner member with a bearing race located between the outer and inner members to provide relative rotation of the members. The outer member of each slewing ring is constructed for connection to one section of a vehicle and the inner member of each slewing ring is constructed for connection to the other section of the vehicle.

18 Claims, 4 Drawing Sheets

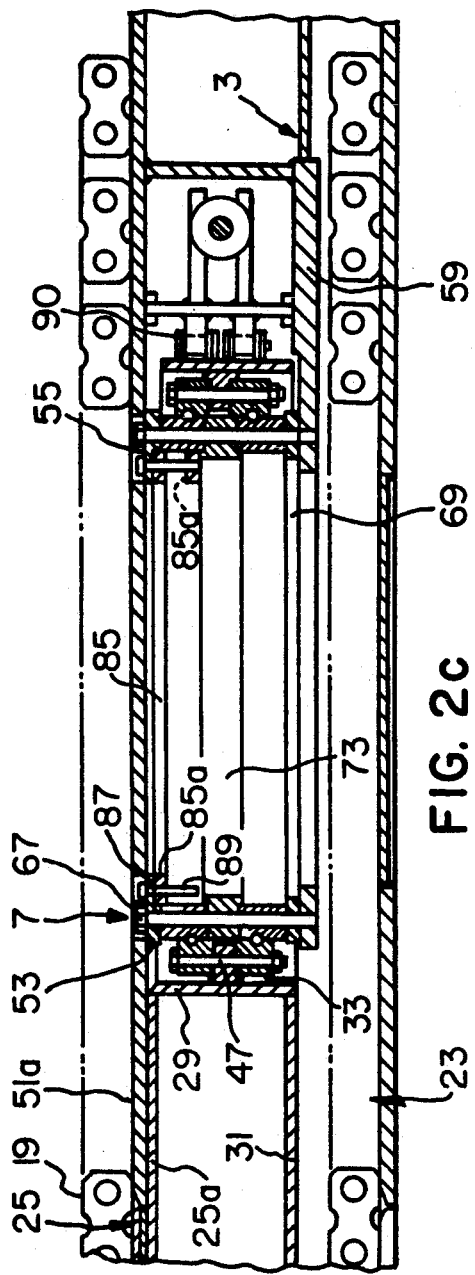
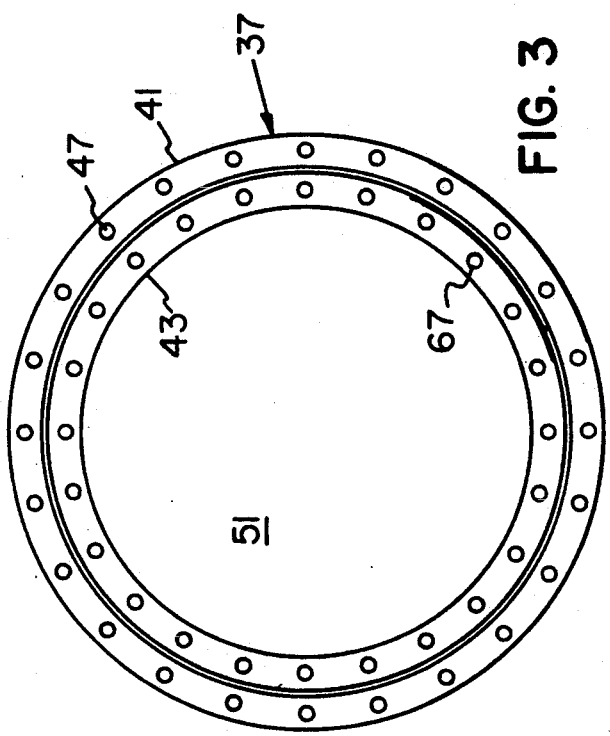
FIG. 2c
FIG. 3

ARTICULATION JOINT

BACKGROUND OF THE INVENTION

1. Field of the Invention

The present invention relates generally to an articulation joint for connecting two sections of a vehicle, and in particular to such a joint for use in a vehicle which must be able to negotiate short radius turns. The joint may also be used in conveyors.

An important use of such an articulation joint is as a vertical pivot joint in an articulated shuttlecar for use in mining operations having a plurality of pivotally connected sections.

2. Description of the Prior Art

Articulation joints for use in conveyors, shuttlecars and other haulage vehicles are known in the art. Most equipment of this type includes horizontal pivot joints which permit the equipment to operate on undulating surfaces. In haulage vehicles with vertical pivot joints, the loading on the joints is generally low since the joint is normally between the cab portion of the vehicle and the load carrying portion of the vehicle.

U.S. Pat. No. 4,160,619 discloses a vertical pivot joint which is located in the middle of a mine shuttlecar. The pivot joint in that patent has spaced upper and lower plates on one part of the shuttlecar which are pivotally connected to spaced upper and lower plates on the other part of the shuttlecar. The pivotal connection incorporates bearing races, which are spaced apart to accommodate a pair of steering rams between them. Because of the spacing, the joint cannot withstand high loads. Also, the arrangement of the plates in the joint disclosed in that patent requires that the joint be assembled from above and from below, which is a disadvantage.

SUMMARY OF THE INVENTION

The present invention is directed to an articulation joint for pivotally connecting two adjacent sections of a vehicle such as a shuttlecar. The joint includes upper and lower slewing rings, each of which includes an outer member and an inner member with a bearing race located between the two members. The inner and outer members of each ring are connected and each outer member is connected to one section of the vehicle and each inner member is connected to the other section of the vehicle. The upper and lower slewing rings are rigidly connected to each other with an inner spacer therebetween. The connection of the outer members of the slewing rings to one section of the vehicle and the connection of the inner members of the slewing rings to the other section of the vehicle permits the sections to rotate relative to each other about a vertical axis.

One section of the vehicle includes a flat horizontal annular tongue with a plurality of circumferentially spaced apertures therein extending parallel to the central axis of the annulus. The outer members of each slewing ring are secured to opposite faces of the horizontal tongue by bolts passing through the apertures in the outer members and aligned apertures in the tongue.

One section of the vehicle forms a male half of the articulation joint and the other section of the vehicle forms a female half of the articulation joint. The female half of the joint has two vertically spaced substantially parallel horizontally extending plates which receive the male half between them. The inner members of each slewing ring are connected to the plates of the section of the vehicle which forms the female half of the articulation joint.

The inner members of the two slewing rings and the inner spacer ring located therebetween are connected to the two spaced substantially parallel horizontally extending plates by threaded connecting bolts. The bolts pass through a plurality of vertically aligned, circumferentially spaced apertures in the inner members of the rings and aligned openings in the inner spacer ring.

A location ring is preferably provided to locate the inner member of the upper slewing ring below the lower surface of the upper one of the two spaced horizontally extending plates of the female half of the articulation joint. A lower annular spacer is provided between the upper surface of the lower one of the two spaced horizontally extending plates of the female half of the articulation joint and the inner member of the lower slewing ring.

The upper one of the two spaced horizontally extending plates of the female half of the articulation joint is provided with a plurality of circumferentially spaced recesses in its upper surface. The recesses are sufficiently deep to receive the heads of the connecting bolts so that the heads do not project above the upper surface of the upper plate. The heads of studs for securing the location ring for the inner member of the upper slewing ring are also located in the recesses.

The male half of the articulation joint is formed with two vertically spaced substantially parallel plates attached to a vertical annular member with an arcuate step in the upper plate. The arcuate step is centered on the pivot axis of the articulation joint and the upper plate of the female half of the articulation joint has a projecting portion with an arcuate edge which snugly fits within the arcuate step on the male half of the articulation joint.

The two joint halves form a relatively movable section of a vehicle and an upper run of a conveyor is movable across the upper surfaces of the upper plates of the two halves. A return run of the conveyor passes below the articulation joint.

The arrangement described above provides a substantially rigid articulation joint and has the advantage that it can be completely assembled from above since the bolts connecting the outer members of the slewing rings to the horizontal tongue can be positioned before the joint is completely assembled. After assembly, all of the connecting bolts can be inserted from the top of the assembled joint. This is an important safety factor.

A complete understanding of the invention will be obtained from the following description when taken in connection with the accompanying drawings wherein like reference characters identify like parts throughout.

BRIEF DESCRIPTION OF THE DRAWINGS

FIG. 1b is a schematic side elevation of the shuttlecar shown in Fig. 1a;

FIG. 2c is a broken vertical section through an assembled articulation joint;

FIG. 3 is a plan view of a slewing ring; and

DESCRIPTION OF A PREFERRED EMBODIMENT

Figure 1A:
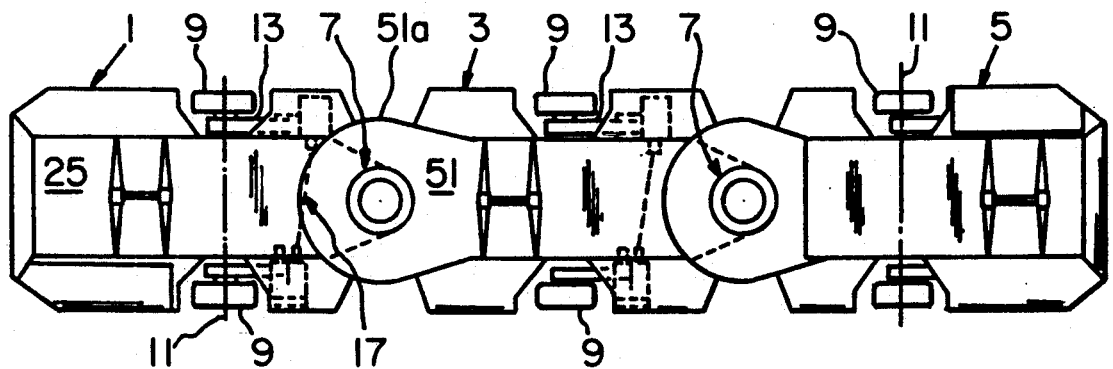
FIG. 1a is a schematic plan view of a shuttlecar having three sections connected by two articulation joints.
Figure 1B:
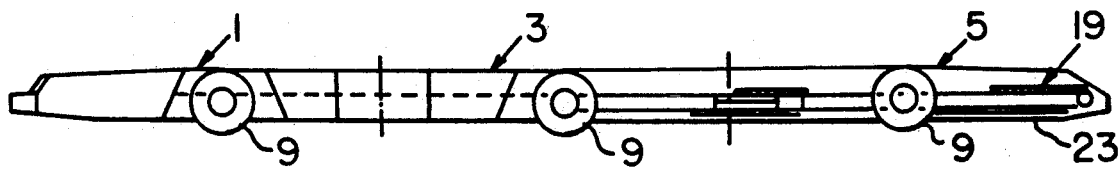
Figure 1C:
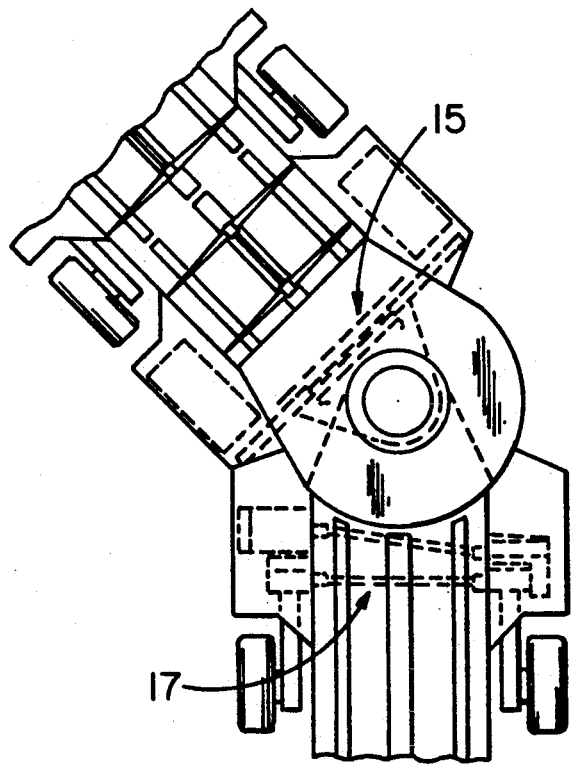
FIG. 1c is a plan view showing two connected sections of a shuttlecar in a turning mode.

FIGS. 1a-1c of the drawings show an articulated shuttlecar, which is the subject of our co-pending U.S. patent application Ser. No. 07/906,569 filed contemporaneously herewith. The articulation shuttlecar has end sections 1 and 5 pivotally connected to a center section 3 by articulation joints 7 of the present invention. Each section 1, 3 and 5 has a pair of laterally spaced ground engaging wheels 9 and end sections 1 and 5 are divided into vertically movable portions by a horizontal pivot joint 11, the longitudinal axis of which corresponds with the rotation axis of wheels 9 for that section of the shuttlecar. Each wheel 9 is rotatably supported on the free end of a trailing arm 13 of a bell crank lever which is pivotally connected to the chassis of that section of the shuttlecar by a suspension system which is the subject of our co-pending U.S. patent application Ser. No. 07/906,758 filed contemporaneously herewith. The shuttlecar is steered by a steering mechanism indicated generally at 15 in FIG. 1c of the drawings. The steering mechanism is the subject of our co-pending U.S. patent application Ser. No. 07/906,869 filed contemporaneously herewith. Each pair of wheels 9 is driven by a motor through a transmission system shown generally at 17 in FIG. 1c of the drawings. The transmission system is the subject of our co-pending U.S. patent application Ser. No. 07/906,894 filed contemporaneously herewith.

An endless chain conveyor 19 has an upper run passing over the upper surface of the shuttlecar from end to end. The construction of the conveyor is well-known to those skilled in the art and has a plurality of spaced transverse flight bars. The conveyor has a lower return run 23 along the underside of the shuttlecar as shown in FIG. 2b of the drawings.

The articulation joint is described hereinafter with reference to FIGS. 2a-2c of the drawings. Referring specifically to FIG. 2b of the drawings, a deck 25 of shuttlecar section 1 is stepped down to provide an arcuate edge 27. A portion of deck 25 is formed by a plate 25a which extends away from edge 27. A vertical annular member 29 has its upper edge welded to the edge of plate 25a and its lower edge is welded to the edge of a bottom plate 31 which is substantially parallel to and spaced below plate 25a. An annular horizontal tongue 33 is welded to the inner surface of annular member 29 approximately midway between the upper and lower edges of member 29. The tongue is provided with a plurality of spaced apertures 35 around its circumference.

When articulation joint 7 is assembled as shown in FIG. 2c of the drawings, the outer annular member 41 of an upper slewing ring 37 is supported on the upper face of annular horizontal tongue 33 and the outer annular member 41 of a lower slewing ring 39 bears against the lower face of annular horizontal tongue 33. Inner annular member 43 of each slewing ring is supported for rotation within outer member 41 of the slewing ring by a plurality of ball bearings 45 circumferentially spaced around the outer periphery of the inner member. Outer annular member 41 of each slewing ring has a plurality of circumferentially spaced apertures therethrough corresponding in size and spacing to apertures 35 in annular horizontal tongue 33. Slewing rings 37 and 39 are held in assembled relationship with horizontal tongue 33 by bolts 47 passing through the apertures in the slewing rings and apertures 35 in tongue 33. Each bolt 47 is threaded into a nut 49 located below lower slewing ring 39.

Figure 2A:
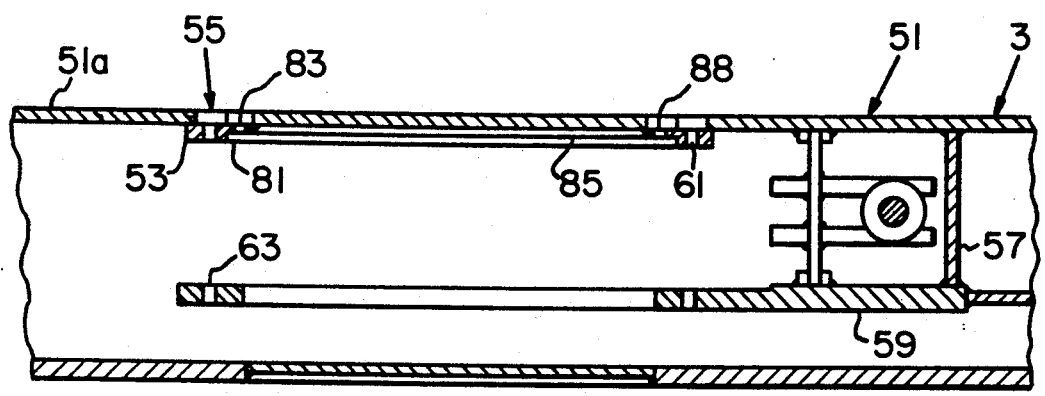
FIG. 2a is a broken vertical section through the female half of an articulation joint.
Figure 2B:
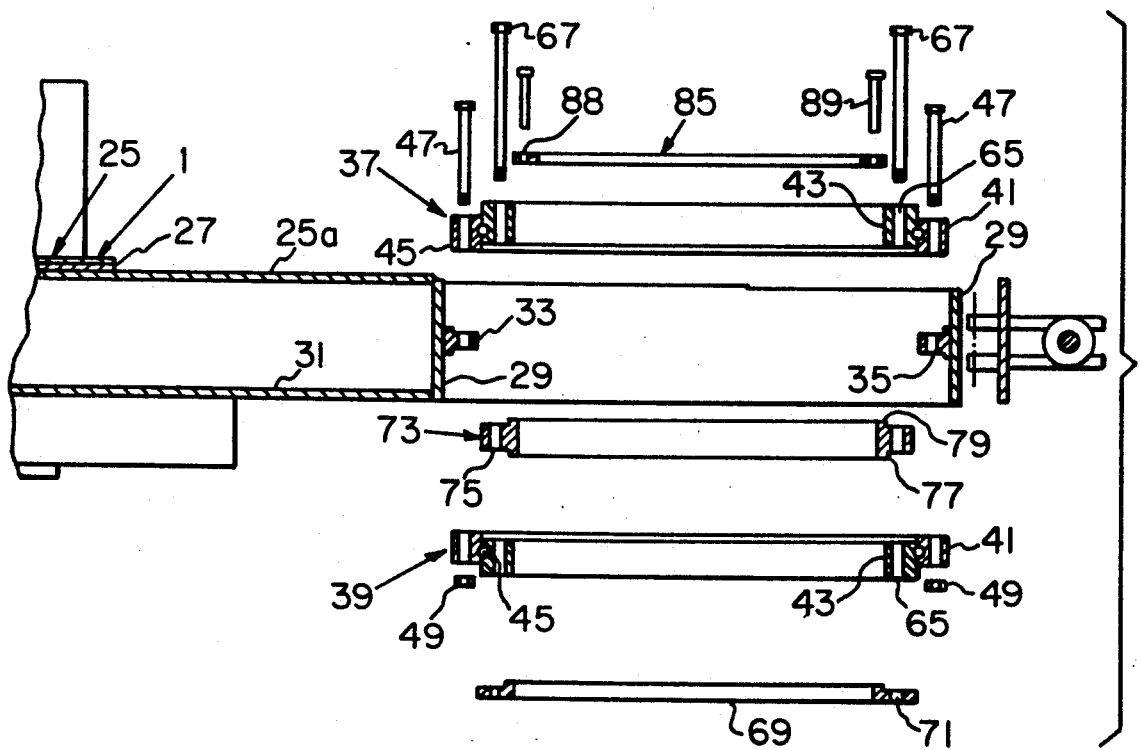
FIG. 2b is an exploded broken vertical section through the male half of an articulation joint.
Figure 4:
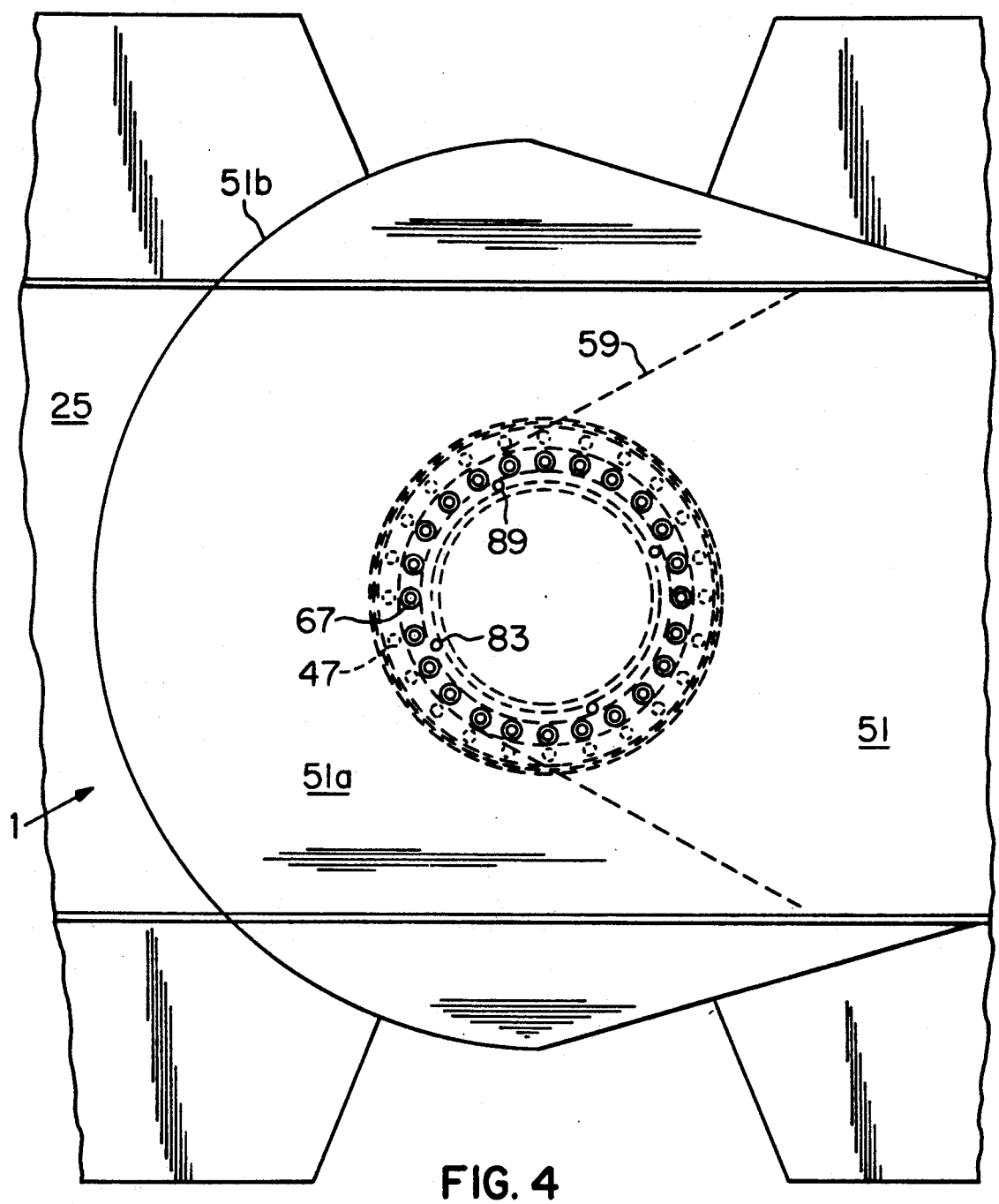
FIG. 4 is an enlarged broken plan view of two sections connected by an articulation joint.

Inner member 43 of each slewing ring is connected to center section 3 of the shuttlecar, a part of which is shown in FIG. 2a of the drawings. The deck 51 of center section 3 has a bulbous nose portion 51a with an arcuate edge 51b as shown in FIG. 4 of the drawings. The edge 51b is configured to form a snug fit with arcuate edge 27 in deck 25 of section 1 as shown in FIG. 2c of the drawings. A strengthening ring 53 is welded to the underside of nose portion 51a of deck 51 and a plurality of circumferentially spaced holes 55 are formed in deck 51 aligned with apertures 61 in ring 53. A downwardly extending transverse plate 57 is welded to the lower surface of deck 51 spaced away from edge 51b and a horizontal bottom plate 59 spaced from and substantially parallel with deck 51 is welded to the lower edge of plate 57. A plurality of circumferentially spaced apertures 63 are arranged in a circle in horizontal bottom plate 59 and have the same spacing as apertures 61 in strengthening ring 53. Each aperture 63 is tapped to provide internal screw threads therein.

The inner and outer circumferences of strengthening ring 53 correspond with the inner and outer circumferences of inner annular members 43 of slewing rings 37 and 39. Each inner annular member 43 is provided with a plurality of circumferentially spaced axially extending apertures 65, the size and spacing of which correspond with the size and spacing of apertures 61 in strengthening ring 53 to enable the inner members of the slewing rings to be connected to shuttlecar section 3 by elongated threaded bolts 67. As shown in FIG. 2c of the drawings, the upper face of slewing ring 37 is in contact with the lower face of strengthening ring 53 and the lower face of slewing ring 39 is supported on a lower annular spacer 69 provided with a plurality of circumferentially spaced apertures 71 aligned with apertures 63 in horizontal bottom plate 59. Annular spacer 69 is supported on the upper surface of horizontal bottom plate 59.

In order to stiffen the articulation joint thus formed, an annular inner spacer 73 having a plurality of circumferentially spaced apertures 75, the spacing and size of which correspond with the spacing and size of apertures 65 in inner members 43 of slewing rings 37 and 39, is located between the inner members 43 of the slewing rings. Inner spacer 73 is stepped on its upper and lower edges as shown at 77 and 79 in FIG. 2b of the drawings to locate inner members 43 of the slewing rings and the outer diameter of inner spacer 73 is such that the inner spacer forms a snug fit within annular horizontal tongue 33. Apertures 75 in inner spacer 73 are aligned with apertures 65 in annular members 43 of the slewing rings.

Bolts 67 pass through apertures 65 in upper slewing ring 37, apertures 75 in inner spacer 73, apertures 65 in lower slewing ring 39, and apertures 71 in lower spacer 69. The lower end of each bolt 67 is threadedly engaged in a tapped aperture 63 in horizontal bottom plate 59. The heads of bolts 67 are received in recesses 55 of deck 51 so that they do not project above the upper surface of the deck.

Strengthening ring 53 has an internal annular stepped recess 81 on its lower face and a plurality of circumferentially spaced apertures 83 are provided in ring 53 adjacent annular stepped recess 81. The annular stepped recess is designed to accept a location ring 85 which is provided with a plurality of circumferentially spaced apertures 87, the location and spacing of which correspond with those of apertures 83. Apertures 87 are internally tapped to provide a screw thread and location ring 85 is held in position within strengthening ring 53 by a plurality of thread studs 89 passing through apertures 83 in strengthening ring 53 and threadedly engaged with threaded apertures 87. As shown in FIG. 2c of the drawings, there are alternate positions for location ring 85. An upper position is shown at 85a and a lower position is shown at 85b. The thickness of location ring 85 is greater than the depth of internal annular recess 81 and the outer diameter of location ring 85 corresponds with the inner diameter of inner member 43 of upper slewing ring 37 so that when the articulation joint is assembled location ring 85 forms a snug fit within inner member 43 to accurately locate upper slewing ring 37 in shuttlecar section 3.

As shown in FIGS. 2b and 2c of the drawings, spaced plates 25a and 31 of shuttlecar section 1 together with annular vertical member 29 provide a male half of an articulation joint 7 whereas upper plate 51 forming nose portion 51a and horizontal bottom plate 59 form a female half of an articulation joint 7. When the articulation joint is assembled, the male half of the joint fits within the female half of the joint and the outer members of the two slewing rings are firmly connected to the male half. The inner members of the slewing rings are firmly connected to the female half by location ring 85, inner spacer 73 and lower spacer 69 associated with the female portion. A substantially rigid articulation joint incorporating the spaced slewing rings is thereby provided.

One or more brackets are connected to the outer surface of a portion of vertical annular member 29 as shown in FIG. 2c of the drawings and a pair of steering chains 90 pass between the brackets and have an end connected to vertical annular member 29. The opposite end of each steering chain 90 is connected to a steering plate which is moveable by extensible and retractable means secured to shuttlecar section 3 so that extension and retraction of the means cause the steering chains to apply a moment arm to vertical annular member 29 to cause articulation of the joint which steers the shuttlecar.

As shown in FIGS. 2b and 2c of the drawings, bolts 47 connecting the outer members of slewing rings 37 and 39 to annular horizontal tongue 33 can be inserted from above, and likewise, bolts 67 for connecting the inner members of the slewing rings to shuttlecar section 3 can be inserted from the top of the joint. This means that the assembly and servicing of the joint can be undertaken from above, which is an important safety feature.

While a specific embodiment of the invention has been described in detail herein, it will be appreciated by those skilled in the art that various modifications and alternatives to the embodiment could be developed in light of the overall teachings of the disclosure. Accordingly, the particular arrangement is illustrative only and is not limiting as to the scope of the invention which is to be given the full breadth of the appended claims and any and all equivalents thereof.

We claim:

1. An articulation joint adapted to pivotally connect two adjacent sections of a vehicle, said joint comprising a first slewing ring and a second slewing ring, each of said slewing rings having an outer member and an inner member connected to said outer member, a bearing race located between said outer member and said inner member of each of said slewing rings for relative rotation of said outer and inner members, means for connecting said outer member of each of said slewing rings to one section of a vehicle and to each other and means for connecting said inner member of each of said slewing rings to another section of the vehicle, whereby said sections of the vehicle are rotatably connected by said slewing rings.

2. An articulation joint as set forth in claim 1 wherein said means for connecting said outer member of each of said slewing rings to said one section of the vehicle and to each other includes a substantially vertical annular member attached to said one section of said vehicle and a substantially horizontal inwardly extending tongue attached to said vertical annular member, a plurality of circumferentially spaced apertures in said horizontal tongue extending parallel to the central axis of said vertical annular member, said outer member of each of said slewing rings having a plurality of circumferentially spaced openings therein aligned with said apertures in said horizontal tongue and bolts passing through said openings in said outer members of slewing rings and said apertures in said horizontal tongue to secure said slewing rings to said horizontal tongue.

3. An articulation joint as set forth in claim 2 including a plurality of brackets welded to an outer arcuate portion of said vertical annular member and means adapted to steer a vehicle passing through said brackets and connected to said vertical annular member to rotate said sections of the vehicle relative to each other about said articulation joint.

4. An articulation joint as set forth in claim 2 wherein said inner member of each of said slewing rings has a plurality of circumferentially spaced openings therein, an inner spacer ring between said inner members of said slewing rings, a plurality of circumferentially spaced apertures in said inner spacer ring having the same spacing as said openings in said inner member of each of said slewing rings, and a plurality of threaded bolts passing through said openings in said inner members of said slewing rings and said apertures in said inner spacer ring for connecting said inner members of said slewing rings and said inner spacer ring to the other section of the vehicle.

5. An articulation joint as set forth in claim 4 including a location ring adapted to locate said inner member of said first slewing ring relative to said other section, and a lower spacer member located below said inner member of said second slewing ring.

6. In a vehicle having a first section and a second section the improvement comprising an articulation joint pivotally connecting said first section to said second section, said articulation joint including a first slewing ring and a second slewing ring, each of said slewing rings having an outer member and an inner member connected to said outer member and a bearing race located between said outer member and said inner member, means for connecting said outer member of each of said slewing rings to said first section of the vehicle and to each other and means for connecting said inner member of each of said slewing rings to said second section of the vehicle to rotatably connect said sections of the vehicle, whereby said first section of the vehicle can pivot about a vertical axis relative to said second section of the vehicle.

7. The invention set forth in claim 6 wherein said first section and said second section are part of a shuttlecar, and a chain conveyor having an upper run movable across the top of said sections and said articulation joint and a lower return run passing beneath said sections and said articulation joint.

8. The invention set forth in claim 6 wherein said first section of the vehicle is formed as a male half of said articulation joint, and said second section of said vehicle is formed as a female half of said articulation joint.

9. The invention set forth in claim 8 wherein said female half of said articulation joint is formed by two vertically spaced substantially parallel horizontally extending plates and said male half of said joint is formed by two vertically spaced horizontally extending plates and substantially vertical means extending between and connected to said plates, means connecting said inner member of each of said slewing rings to said female half of said joint, and means connecting said outer member of each of said slewing rings to said male half of said joint.

10. The invention set forth in claim 9 wherein said upper one of said horizontally extending plates of said female half of said articulation joint is provided with a plurality of circumferentially spaced recesses in its upper face and threaded bolts having heads on one end extend through said upper one of said plates, said heads being located in said recesses so that said heads do not project above the upper surface of said upper horizontally extending plate of said female half of said articulation joint.

11. The invention set forth in claim 8 wherein said male half of said articulation joint includes two vertically spaced substantially parallel horizontally extending plates, a step forming an arcuate edge in the upper surface of the upper one of said horizontally extending plates, said arcuate edge being radially centered on the pivot axis of said articulation joint, and the upper plate of said female half of said articulation joint having a projecting portion with an arcuate edge which snugly mates with said arcuate edge in said upper surface of said upper one of said horizontally extending plates in said male half of said articulation joint.

12. The invention set forth in claim 10 including a location ring below said upper horizontally extending plate of said female half, bolts for securing said location ring below said upper plate and each of said bolts having a head located in one of said recesses.

13. In a vehicle as set forth in claim 6 wherein said means for connecting said outer member of each of said slewing rings to said first section of the vehicle and to each other includes a substantially vertical annular member attached to said first section of said vehicle and a substantially horizontal inwardly extending tongue attached to said vertical annular member, a plurality of circumferentially spaced apertures in said horizontal tongue extending parallel to the central axis of said vertical annular member, said outer member of each of said slewing rings having a plurality of circumferentially spaced openings therein aligned with said apertures in said horizontal tongue and bolts passing through said openings in said outer members of slewing rings and said apertures in said horizontal tongue to secure said slewing rings to said horizontal tongue.

14. In a vehicle as set forth in claim 13 including a plurality of brackets welded to an outer arcuate portion of said vertical annular member and means adapted to steer the vehicle passing through said brackets and connected to said vertical annular member to rotate said sections of the vehicle relative to each other about said articulation joint.

15. In a vehicle as set forth in claim 13 wherein said inner member of each of said slewing rings has a plurality of circumferentially spaced openings therein, an inner spacer ring between said inner members of said slewing rings, a plurality of circumferentially spaced apertures in said inner spacer ring having the same spacing as said openings in said inner member of each of said slewing rings, and a plurality of threaded bolts passing through said openings in said inner members of said slewing rings and said apertures in said inner spacer ring for connecting said inner members of said slewing rings and said inner spacer ring to the other section of the vehicle.

16. In a vehicle as set forth in claim 15 including a location ring adapted to locate said inner member of said first slewing ring relative to said other section, and a lower spacer member located below said inner member of said second slewing ring.

17. An articulation joint adapted to pivotally connect two adjacent sections of a vehicle, said joint comprising a first upper slewing ring and a second lower slewing ring, each of said upper and lower slewing rings having an outer member and an inner member coaxial with said outer member and connected to said outer member, a bearing race located between said outer member and said inner member of each of said upper and lower slewing rings to provide for relative rotation of said outer and inner members, means for connecting said outer member of each of said upper and lower slewing rings to said one section of the vehicle including a substantially vertical annular member attached to said one section of said vehicle and a substantially horizontal inwardly extending annular tongue coaxial with said vertical annular member and attached to said vertical annular member, a plurality of circumferentially spaced apertures in said horizontal tongue extending parallel to the longitudinal axis of said vertical annular member, said outer member of each of said upper and lower slewing rings having a plurality of circumferentially spaced openings therein aligned with said apertures in said horizontal annular tongue and bolts passing through said openings in said outer members of said upper and lower slewing rings and said apertures in said horizontal annular tongue to secure said outer members of said upper and lower slewing rings to said horizontal annular tongue, and means for connecting said inner member of each of said upper and lower slewing rings to another section of the vehicle, whereby said sections of the vehicle are rotatably connected by said upper and lower slewing rings.

18. In a vehicle having a first section and a second section the improvement comprising an articulation joint pivotally connecting said first section to said second section, said articulation joint including a first upper slewing ring and a second lower slewing ring, each of said upper and lower slewing rings having an outer member and an inner member coaxial with said outer member and connected to said outer member, a bearing race located between said outer member and said inner member of each of said upper and lower slewing rings, means for connecting said outer member of each of said upper and lower slewing rings to said first section of the vehicle including a substantially vertical annular member attached to said first section of said vehicle and a substantially horizontal inwardly extending annular tongue attached to said vertical annular member, a plurality of circumferentially spaced apertures in said horizontal tongue extending parallel to the longitudinal axis of said vertical annular member, said outer member of each of said upper and lower slewing rings having a plurality of circumferentially spaced openings therein aligned with said apertures in said horizontal annular tongue and bolts passing through said openings in said outer members of each of said upper and lower slewing rings and said apertures in said horizontal annular tongue to secure said outer members of said upper and lower slewing rings to said horizontal annular tongue and means for connecting said inner member of each of said upper and lower slewing rings to said second section of the vehicle to rotatably connect said first and second sections of said vehicle.

* * * * *